(12) United States Patent
Ferrell et al.

(10) Patent No.: US 8,260,800 B2
(45) Date of Patent: Sep. 4, 2012

(54) SYSTEM AND METHOD FOR IMAGE GENERATION, DELIVERY, AND MANAGEMENT

(75) Inventors: Terry L. Ferrell, Frisco, TX (US); Robert V. Byron, Frisco, TX (US); Enrique Sanchez, Jr., Frisco, TX (US)

(73) Assignee: Nexplore Technolgies, Inc., Plano, TX (US)

( * ) Notice: Subject to any disclaimer, the term of this patent is extended or adjusted under 35 U.S.C. 154(b) by 338 days.

(21) Appl. No.: 12/265,804

(22) Filed: Nov. 6, 2008

(65) Prior Publication Data

US 2010/0114982 A1 May 6, 2010

(51) Int. Cl.
*G06F 17/30* (2006.01)
(52) U.S. Cl. ........................ 707/759; 707/769
(58) Field of Classification Search .................. 707/709, 707/711, 770, 759, 758; 715/749, 236
See application file for complete search history.

(56) References Cited

U.S. PATENT DOCUMENTS

| | | | |
|---|---|---|---|
| 6,271,840 B1 * | 8/2001 | Finseth et al. ................ 715/236 |
| 6,438,539 B1 | 8/2002 | Korolev et al. |
| 7,136,882 B2 * | 11/2006 | Collins et al. ........................ 1/1 |
| 7,380,212 B2 | 5/2008 | Cody et al. |
| 7,610,219 B2 | 10/2009 | Sayed |
| 7,769,895 B1 * | 8/2010 | Williams et al. ............. 709/246 |
| 7,831,581 B1 * | 11/2010 | Emigh et al. .................. 707/706 |
| 2002/0046232 A1 | 4/2002 | Adams et al. |
| 2003/0030679 A1 * | 2/2003 | Jain ............................... 345/854 |
| 2004/0049541 A1 | 3/2004 | Swahn |
| 2004/0143580 A1 * | 7/2004 | Chi et al. ....................... 707/100 |
| 2004/0189699 A1 | 9/2004 | Dobronsky |
| 2005/0283468 A1 | 12/2005 | Kamvar et al. |
| 2006/0004716 A1 * | 1/2006 | Hurst-Hiller et al. ............. 707/3 |
| 2006/0224582 A1 | 10/2006 | Hogue |
| 2006/0224587 A1 | 10/2006 | Zamir et al. |
| 2006/0265417 A1 | 11/2006 | Amato et al. |
| 2007/0239716 A1 | 10/2007 | Weininger et al. |
| 2007/0244866 A1 | 10/2007 | Mishkanian et al. |

(Continued)

FOREIGN PATENT DOCUMENTS

WO 2005091175 A1 9/2005

OTHER PUBLICATIONS http://www.websnapr.com/support/; "websnapr 2.0"; Service by construktiv and trafficmaxx; At least as early as Nov. 25, 2008; 2 pp.

(Continued)

*Primary Examiner* — Sherief Badawi
(74) *Attorney, Agent, or Firm* — Mark W Handley

(57) ABSTRACT

A system and method for digital image generation, delivery, and management is provided. The automated image generation, delivery, and management system and method serves processed images over a network. A requesting application provides a URL in addition to field values. The image delivery system retrieves and serves an image based on the requested URL. A sized image and a default image are saved in a database for rapid retrieval. If the system can generate an image sized to the request, it does so. Otherwise, the system visits the URL to obtain a snapshot of the rendered webpage. If no webpage is available with the URL as provided, the URL is truncated until a displayable webpage is rendered.

15 Claims, 3 Drawing Sheets

U.S. PATENT DOCUMENTS

Figure 1:
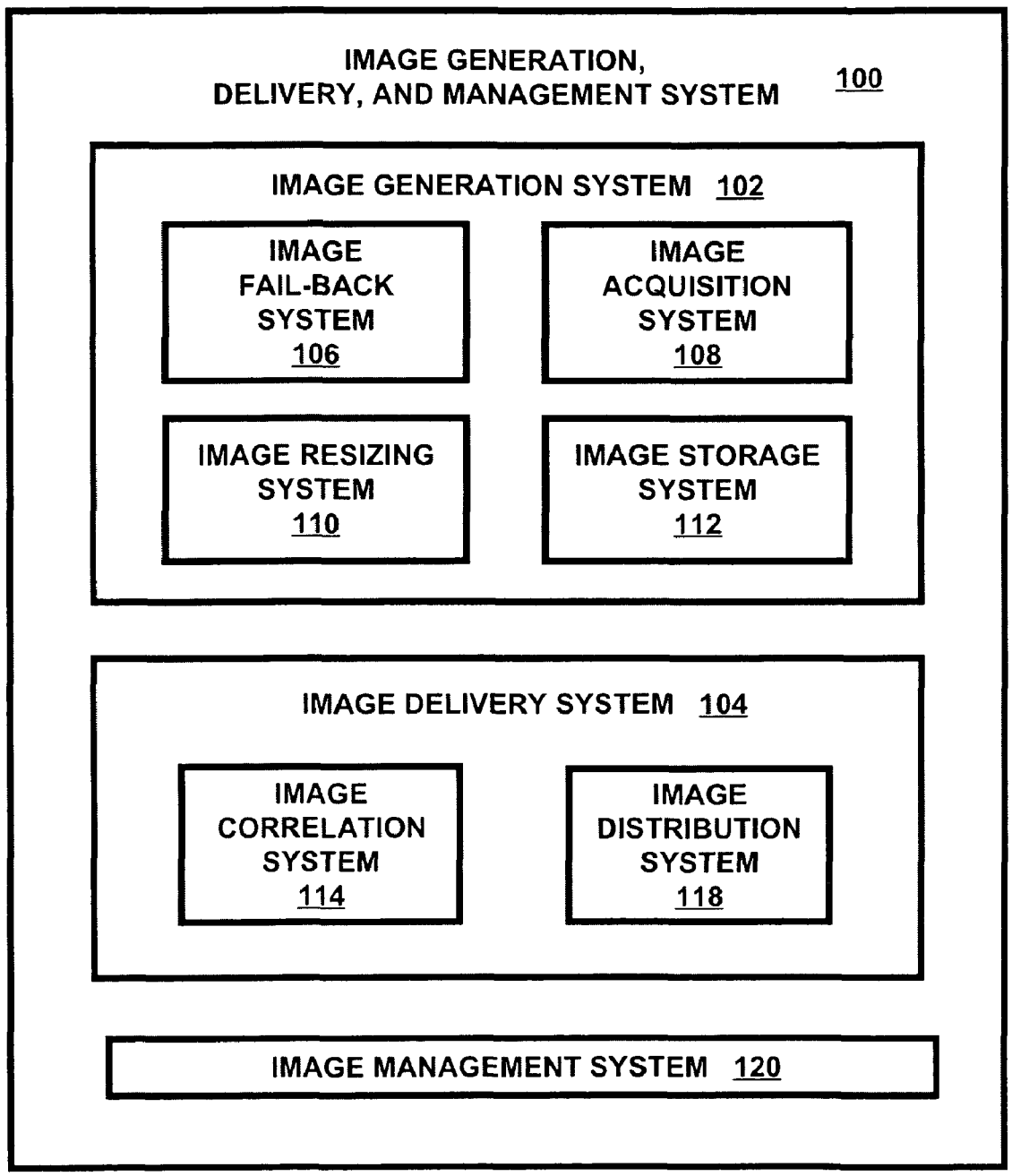

| | | |
|---|---|---|
| 2007/0255755 A1 | 11/2007 | Zhang et al. |
| 2008/0140063 A1 | 6/2008 | Kumar |
| 2008/0140637 A1 | 6/2008 | Kumar |
| 2008/0140712 A1 | 6/2008 | Weber et al. |
| 2008/0140806 A1 | 6/2008 | Kumar |
| 2008/0201326 A1 | 8/2008 | Cotter et al. |
| 2009/0012940 A1 | 1/2009 | Ives et al. |
| 2009/0307603 A1* | 12/2009 | Gowda et al. ................ 715/749 |
| 2009/0327101 A1 | 12/2009 | Sayed |
| 2009/0327421 A1* | 12/2009 | Fu et al. ....................... 709/204 |

OTHER PUBLICATIONS

Wu, et al.; "Harvesting Social Knowledge from Folksonomies"; HT; Aug. 22-25, 2006, Odense, Denmark; pp. 111-114.

* cited by examiner

SYSTEM AND METHOD FOR IMAGE GENERATION, DELIVERY, AND MANAGEMENT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to image processing systems, and more specifically to automated web-based image generation, delivery, and management systems.

2. Description of Related Art Including Information Disclosed Under 37 CFR 1.97 and 1.98

Images are a critical component of web-based content. The popularity of the Internet has increased exponentially due in large part to image content. With over 8 billion web pages on the Internet, many having more than one image per page, the management of web-based images can be quite cumbersome. The massive quantity and size of the images present significant problems in storage and bandwidth. The frequency at which site content changes only exacerbates the situation. The dynamic environment of today's web-based content requires new approaches to image generation, delivery, and management.

The present invention derives technical advantages because other solutions do not modify URLs to generate relevant images associated with the URL. Moreover, other solutions do not modify subdomains to generate relevant images associated with the URL.

The present invention achieves further technical advantages by generating images in a plurality of sizes for faster transfer. By performing the resizing on the server side, the application is not slowed by client side processing. Advantageously, by maintaining a plurality of sizes of the image, the application may not be slowed by server side processing, and the bandwidth required for displaying images is greatly reduced.

BRIEF SUMMARY OF THE INVENTION

The present invention provides a method, system, and computer software for automatically generating, delivering, and managing digital images in a networked environment. A networked application accesses a computing device that performs the novel method steps.

The system receives a URL and at least one display parameter from the requesting application. The received URL represents the path to an image for display in the application interface. Next, the system determines if the requested image associated with the URL is available in the system database. If the requested image is available, the system provides the image to the application interface for display. If the requested image is not available, the system generates a base image associated with the URL and provides this base image as the requested image. In another embodiment, the system provides a default image to the application interface if both the requested image and the base image are not available or cannot be displayed. The system may also resize the images based on the display parameter prior to providing the image to the application interface.

Alternatively, in the event that the base image associated with the URL cannot be displayed, the system systematically truncates the URL until it can generate an image based on the truncated URL. Once the base image is generated, it is provided to the application interface. If the URL represents a known file type that is inherently not displayable (such as an MP3 music file), the system categorizes the information represented by the URL.

These and other improvements will become apparent when the following detailed disclosure is read in light of the supplied drawings. This summary is not intended to limit the scope of the invention to any particular described embodiment or feature. It is merely intended to briefly describe some of the key features to allow a reader to quickly ascertain the subject matter of this disclosure. The scope of the invention is defined solely by the claims when read in light of the detailed disclosure.

BRIEF DESCRIPTION OF THE SEVERAL VIEWS OF THE DRAWING(S)

Figure 2:
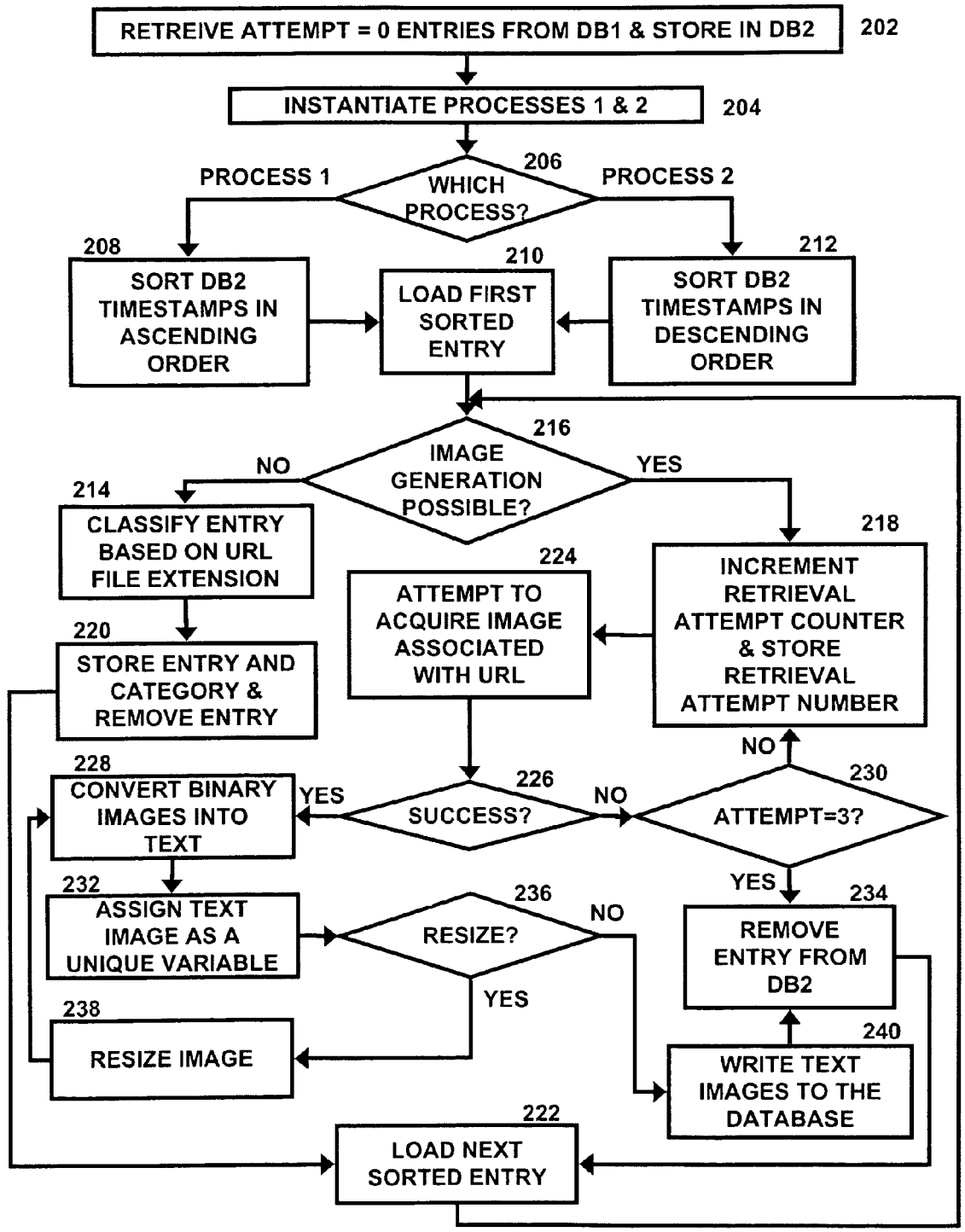
Figure 3:
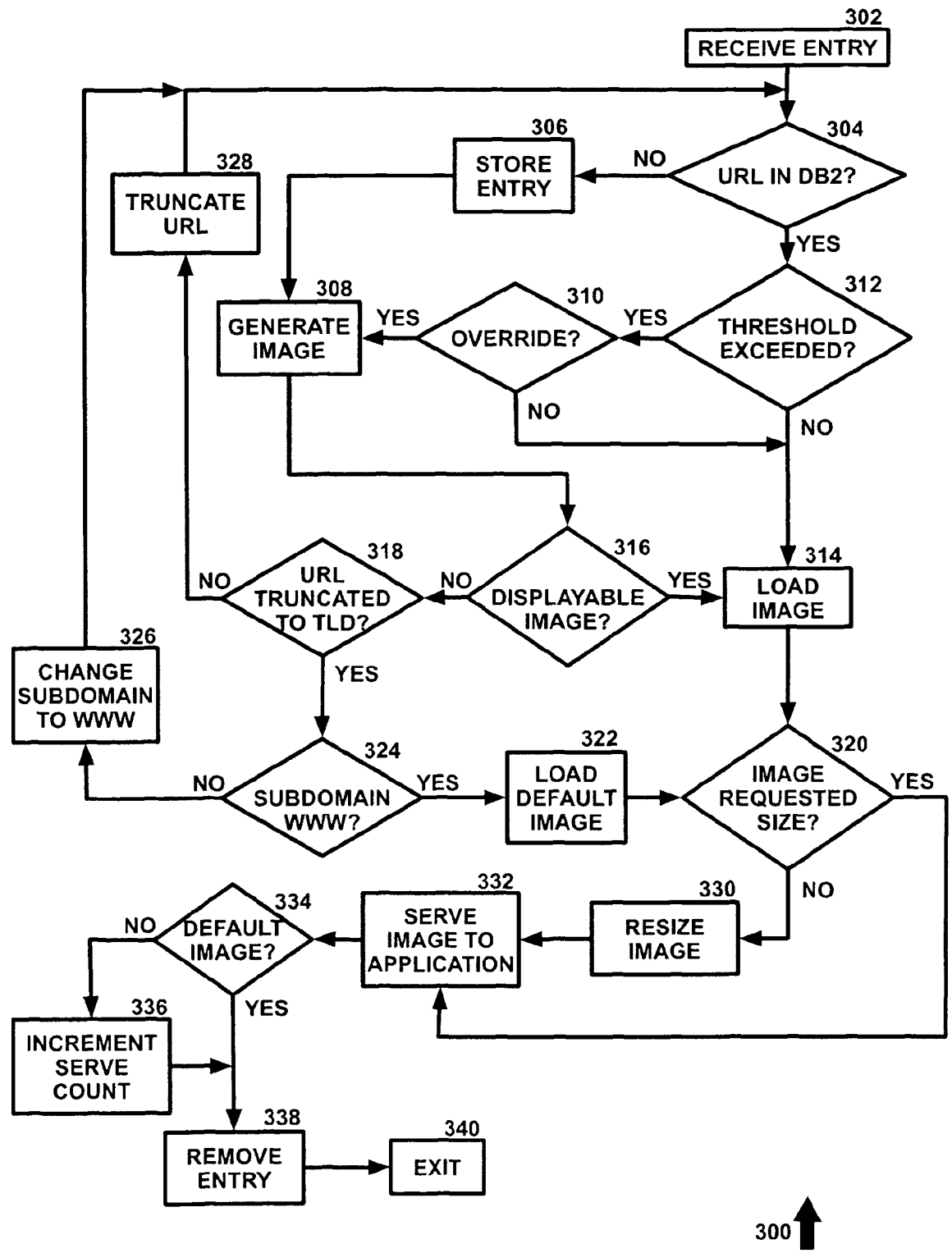

The present invention will be more fully understood by reference to the following detailed description of the preferred embodiments of the present invention when read in conjunction with the accompanying drawings, wherein:

FIG. 1 exemplifies a diagram of an image generation, delivery, and management system for serving images over a network, in accordance with principles of the present invention;

FIG. 2 exemplifies a diagram of a method for generating images, in accordance with principles of the present invention; and FIG. 3 exemplifies a diagram of a method for managing image generation, in accordance with principles of the present invention.

The above figures are provided for the purpose of illustration and description only, and are not intended to define the limits of the disclosed invention. Use of the same reference number in multiple figures is intended to designate the same or similar parts. Furthermore, if and when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood.

DETAILED DESCRIPTION OF THE INVENTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning the Internet, digital content, and the like have been omitted inasmuch as such details are not considered necessary to obtain a complete understanding of the present invention, and are considered to be within the skills of persons of ordinary skill in the relevant art.

Referring to FIG. 1, there is shown a diagram of an automated image generation, delivery, and management system (100) for serving processed images over a network, in accordance with principles of the present invention. The system (100) is preferably implemented in hardware, software, or a suitable combination of hardware and software thereof and may comprise one or more software systems operating on a digital signal processing platform or other suitable processing platforms. As used herein, "hardware" can include a combination of discrete components, an integrated circuit, a microprocessor, a controller, a microcontroller, an application-specific integrated circuit (ASIC), an electronic data processor, a computer, a field programmable gate array, or other suitable hardware connectable for interfacing with a network, such as the Internet, considered to be well-known in the art. As used herein, "software" can include one or more objects, agents, threads, lines of code, subroutines, separate software applications, two or more lines of code or other suitable software structures operating in two or more software applications or on two or more processors, or other suitable hardware structures. Furthermore, it is considered that the design, development, and implementation details of all such hardware and software would be apparent to a person having ordinary skill in the art based upon a review of the present description of the invention. In one embodiment, software can include one or more lines of code or other suitable software structures operating in a general purpose software application, such as an operating system, and one or more lines of code or other suitable software structures operating in a specific purpose software application.

Additionally, the system (100) manages the images by verifying images, determining image sizes, and reacquiring images with fields exceeding threshold values. In one embodiment, the system (100) is operable on a networked server capable of sending and receiving data via a web-enabled connection to an application. The application can be resident on a computer, a website, blog, forum, aggregator, and other suitable web-enabled application. The system (100) in this embodiment also includes an image generation system (102) and image delivery system (104).

The image delivery system (104) receives an image request, having a Uniform Resource Locator (URL) and display parameters, from an application and transfers an image to the application in response to the image request. The image delivery system (104) both retrieves and serves an image associated with the URL included in the image request. In one embodiment, the display parameters have fields including, but not limited to, image height and image length. Different embodiments may utilize one or more of these fields in addition to others. In another embodiment, the display parameters are part of the URL.

In the present embodiment, the image delivery system (104) can be achieved with an application programming interface (API), a network connection, a network transfer protocol, HTML, DHTML, JavaScript, Dojo, Ruby, Rails, other suitable applications, or a suitable combination thereof. The image delivery system (104) in this embodiment also includes an image correlation system (114) and an image distribution system (118).

The image correlation system (114) receives the URL and the display parameters and determines whether a requested image associated with the URL having the display parameters is stored in a first database. In one embodiment, the database is a network location.

The image correlation system (114) generates a unique path to the requested image if the requested image is located in the first database or generates retrieval data if the requested image is not located in the first database. In the present embodiment, the retrieval data includes, but is not limited to, the URL, the display parameters, and a retrieval attempt count. In one embodiment, the retrieval attempt count is set to zero if the retrieval data is from a new image request. In another embodiment, the path includes the filename of the image and the directory structure in which the image is located. In yet another embodiment, the path references the requested image if the requested image is available or a default image if the requested image is not available. Additionally, the path can be a URL or a file system path. The path that is a URL can be set to expire after a certain period of time, to avoid referencing from third parties.

The image distribution system (118) receives the path and the image request, and transfers the image having the path to the application via a network connection. Initially, the image distribution system (118) receives the image request from the application, adds a timestamp to the image request indicating when it was received, and stores the image request with the timestamp in a third database until the path associated with the image request is received. Once the path is received, the image is transferred to the application. In one embodiment, a transfer protocol is utilized to ensure proper transfer of the image.

The image generation system (102) is further adapted to receive the retrieval data and to generate, process, and store the image associated with the corresponding URL. In one embodiment, the image generation system (102) can be achieved with an application programming interface (API), a network connection, a network transfer protocol, HTML, DHTML, JavaScript, Dojo, Ruby, Rails, other suitable applications, or a suitable combination thereof. The image generation system (102) includes, but is not limited to, an image fail-back system (106), an image acquisition system (108), an image resizing system (110), and an image storage system (112).

Once the URL is received, the image generation system (102) generates an image associated with the URL, if an image is available. The image generation system (102) then tags the image with tagging data. In one embodiment, the tagging data includes relevant information such as, but not limited to, acquisition timestamp, attempt number, server number, and the like. The image generation system (102) then resizes and stores at least one image to at least one database, and initiates a reacquisition schedule to ensure that the one or more images associated with the URL are maintained relatively current.

The image acquisition system (108) receives the retrieval data and generates a base image associated with the URL, as it would appear in a browser window. The base image is maintained in a database for future retrieval. If the image acquisition system (108) is unable to acquire a base image associated with the URL, the image acquisition system (108) generates fail data that incorporates the retrieval data. The retrieval attempt count is incremented after each failed attempt to acquire a base image associated with the URL. The size of the base image is preferably chosen such that no larger image size is necessary. In one embodiment, the base image size is 1280 pixels by 1024 pixels. Such image size allows downsizing of the base image as necessary based upon request parameters. In another embodiment an exposure length can be set to allow sufficient time for complex webpages to load. The exposure length helps ensure that base images are not generated before the webpage has had time to load all content. The exposure length can be predetermined for each domain associated with the URL.

The image resizing system (110) receives the base image, if available, or a default image if the base image is unavailable, and the display parameters. The image resizing system (110) then generates another image by resizing the base image or default image according to the display parameters. The image resizing system (110) also generates at least one other image by resizing the base image or the default image according to predetermined parameters. In one embodiment, the default image displays text indicating that there is currently no image associated with the URL available.

In another embodiment the requesting application may require multiple sizes of a requested image. The image resizing system (110) in this embodiment generates the request image in a plurality of different sizes. Advantageously, this saves valuable time in supplying the application with the requested images in the requested sizes. In another embodiment the plurality of sizes are in the predetermined parameters. In yet another embodiment the predetermined parameters are contained in the request parameters sent by the application, are resident in the image resizing system (110), or a combination of both.

The image storage system (112) is adapted to receive the base image, the request image, and the at least one other request image, and generate tagging data, with the tagging data having fields with values for the base image, the request image, and at least one other request image. The image storage system (112) then stores the request image and at least one other request image in the first database and the base image in a second database.

The image fail-back system (106) receives the fail data from the image acquisition system (108) and modifies the URL included in the acquisition data for another acquisition attempt by the image acquisition system (108). The image fail-back system (116) modifies the URL if a suitable image associated with the URL cannot be acquired. In one embodiment, the URL is modified by truncating the URL after the top-level domain (TLD). If a suitable image associated with the truncated URL still cannot be acquired, the URL is successively modified by truncating the URL after the second-to-last forward slash, assuming the URL ends with a forward slash, up to the top-level domain until a suitable image is acquired.

Advantageously, the image fail-back system (116) can read the file extension of the URL and categorize the URL for further processing. For example, in one embodiment the URL references a music file, such as an MP3 file, which does not have content that can result in an image. In another embodiment the image fail-back system (116) can categorize the URL having the .mp3 file extension as a music file according to a classification file. The music file header may also be read to determine certain information such as artist, album name, and track name in order to display an appropriate image relating to at least one of the music file fields. Although the aforementioned embodiments include a music file, any file having a header, such as a video file, may be used in addition to the music file. Additionally, the classification system can associate an image with the URL category, so that the image displayed is not based on the URL of the page but rather on the file type. In another embodiment, a stock image, such as a musical note, is rendered for an mp3 file.

The image management system (120) is further adapted to retrieve the base image, the sized image, and the at least one other image from the image storage system (112) and regenerate the base image, the request image, and the at least one other image if at least one of the tagging data field values exceeds a dynamic threshold value. In one embodiment the tagging data fields includes a timestamp, a serve count, or both. In another embodiment the image management system (120) assigns the path to the image distribution system (118). In yet another embodiment the image management system (120) is adapted to receive a refresh flag, which initiates regeneration of the base image, the request image, and the at least one other image. In yet another embodiment the refresh flag can be received directly from the application.

Referring now to FIG. 2, there is shown a flow chart (200) exemplifying control logic embodying features of a method for generating images in accordance with principles of the present invention. The image generation control logic (200) can be implemented as an algorithm on a general purpose computing platform or other suitable microprocessor-based system.

The image generation control logic (200) can leverage the ability of a computer platform to spawn multiple processes and threads by processing entries in a database simultaneously. The speed and efficiency of the image generation control logic (200) is greatly improved by instantiating more than one process, starting at both ends of the database entries and working off the entries while moving toward the middle entry. However, one skilled in the art of programming will appreciate that use of a single processing thread may also be utilized and is within the scope of the present invention.

The image generation control logic (200) process flow of the present embodiment begins at step 202, where entries having a retrieval attempt count field value of zero are retrieved from a first database and stored in a second database. In one embodiment, each entry in the first database includes fields such as, but not limited to, URL, timestamp, retrieval attempt count, and at least one image size. In one embodiment the retrieval attempt count field is zero if there have been no attempts to generate an image associated with the URL. The logic then proceeds to 204.

In the present embodiment, process 1 and process 2 are instantiated (204). Both process 1 and process 2 are sorting processes adapted to sort the entries in the second database. In one embodiment, process 1 sorts the entries in a first order and process 2 sorts the entries in a second order opposite to the first order. The method then proceeds to step 206.

At step 206, it is determined whether the process is process 1 or process 2. If the process is process 1, the logic proceeds to step 208. If the process is process 2, the method proceeds to step 212.

At step 208, process 1 sorts the entries in the second database in ascending order, according to their timestamp. The method then proceeds to step 210.

At step 212, process 2 sorts the entries in the second database in descending order, according to their timestamp. The method then proceeds to step 210.

Steps 210 through 240 are parallel steps for both process 1 and process 2. The description of the method will continue with out explicitly stating that each step is performed by process 1 and process 2. However, each step in steps 210 through 240 are performed by both process 1 and process 2, with the difference being the URL that each process is processing.

At step 210 the URL of the first sorted entry is loaded for processing. In one embodiment, process 1 loads the URL for the entry having the oldest timestamp and process 2 loads the URL for the entry having the most recent timestamp. The method then proceeds to step 216.

At step 216 it is determined whether a base image associated with the URL can be generated. In one embodiment, the determination of whether the base image can be generated is based on the file extension of the URL. If the file extension is of the type that can be displayed in a browser, image generation is possible. If the base image can be generated the method proceeds to step 218. If the base image cannot be generated, the method proceeds to step 214.

At step 214, the entry is classified based on the file extension of the entry's URL. In one embodiment, an ".mp3" file extension classifies the entry as a music file. In another embodiment, the URL is compared against a list of extensions in a classification file, and classified according to parameters in the classification file. An appropriate image is assigned to the URL based on the outcome of the comparison. The parameters determine the category that the URL will be assigned based on the file extension. The method then proceeds to step 220.

At step 220 the entry and its category are stored in the first database. The entry is then removed from the second database. The method then proceeds to step 222.

At step 222 the next entry in the second database is loaded. The logic then proceeds to step 216.

At step 218 the retrieval attempt counter is incremented by one and stored. The method then proceeds to step 224.

At step 224 an attempt is made to acquire the base image associated with the URL. The method then proceeds to step 226.

At step 226 a determination is made as to whether the base image acquisition attempt was successful. If the base image acquisition attempt was successful, the method proceeds to step 228. If the base image acquisition attempt was unsuccessful, the method proceeds to step 230.

At step 230 it is determined whether there have been multiple acquisition attempts. In the present embodiment, a threshold of three acquisition attempts is established. If there have been three acquisition attempts, the logic proceeds to step 234. If there have not been three acquisition attempts, the method proceeds to step 218.

At step 234 the entry is removed from the second database. The logic then proceeds to step 222.

At step 228 the base image is converted from a binary format into a text format. The method then proceeds to step 232.

At step 232 the text formatted base image is assigned a unique variable for further processing. In one embodiment the ruby programming language is utilized to assign the text image to the unique variable. One skilled in the art of programming will appreciate that other programming languages may be utilized and are within the scope of the present invention. The logic then proceeds to step 236.

At step 236 a determination is made as to whether the base image must be resized. In one embodiment the base image size is 1280 pixels by 1024 pixels. If the base image must be resized the logic proceeds to step 238. If the base image needs no resizing the method proceeds to step 240.

At step 238 the base image is resized. In one embodiment the unique variable is resized using the Ruby programming language or other suitable programming or scripting language. In another embodiment the base image is resized according to display parameters. The logic then proceeds to step 228, looping through any additional resizes and assigning the resized images into unique variables.

At step 240 all additional resizing of the images is complete and the at least one text format resize image is stored in the first database. The base image is stored in a third database. The method then proceeds to step 234.

Referring now to FIG. 3, there is shown a flow chart (300) exemplifying control logic embodying features of a method for managing image generation, in accordance with principles of the present invention. The image generation control logic (300) can be implemented as an algorithm on a general purpose computing platform or other suitable microprocessor-based system.

The image generation control logic (300) process flow of the present embodiment begins at step 302, where the entry is received. In this embodiment, the entry, having fields such as URL timestamp and serve count, is received from the requesting application. In another embodiment, the entry, having fields such as URL timestamp and serve count, is retrieved from the second database. In yet another embodiment, entries in the second database each have attempt field values less than a predetermined retrieval value. In this embodiment the predetermined retrieval value is three, but can be any assigned value. One skilled in the art will appreciate and understand that any value may be utilized and is within the scope of the present invention. The logic then proceeds to step 304.

At step 304 a determination is made as to whether the URL is contained in any entries stored in the second database. If the URL is stored in the database, the logic proceeds to step 312. If not, the logic proceeds to step 306.

At step 306 the URL is stored in an array in program memory. In another embodiment, the URL is stored in a database. The logic then proceeds to step 308.

At step 308 the image for display is generated. In one embodiment the image is generated by loading the URL in a browser instance and capturing the base image of the browser area. The logic then proceeds to step 316.

At step 312 a determination is made as to whether the serve count value of the image associated with the URL exceeds a predetermined threshold value. In the present embodiment, the timestamp value of the image is checked against the predetermined threshold value. The threshold value helps ensure that the image is always kept up to date, so that more frequently requested images are refreshed more often. If the value exceeds the threshold value, the logic proceeds to step 310. If the value does not exceed the threshold value, the method proceeds to step 314.

At step 310 a determination is made as to whether the image associated with the URL can be overridden. In the present embodiment, the image associated with the URL is protected from being regenerated by assigned permissions. In another embodiment the permissions can be overridden to allow image regeneration. If the URL permissions can be overridden, the logic proceeds to step 308. If the URL permissions cannot be overridden, the logic proceeds to step 314.

At step 314 the image is loaded. In the present embodiment the image is loaded using the path associated with the image. The logic then proceeds to step 320.

At step 316 a determination is made as to whether the image is displayable. In the present embodiment, if an error message is received during image generation, the image is not displayable. If the image is displayable, the logic proceeds to step 314. If the image is not displayable the logic proceeds to step 318.

At step 318 a determination is made as to whether the URL has been truncated after the TLD. If the URL has been truncated to the TLD the logic proceeds to step 324. If the URL has not been truncated to the TLD the logic proceeds to step 328.

At step 328 the URL is truncated. In the present embodiment the URL is truncated after the TLD. In another embodiment the URL is truncated after the second-to-last forward slash, assuming the URL ends with a forward slash. This truncation can be done repeatedly until the top-level domain is reached. The logic then proceeds to step 304.

At step 324 a determination is made as to whether the URL's subdomain is "www." If the URL's subdomain is "www," the logic proceeds to step 322. If the URL's subdomain is not "www" the logic proceeds to step 326.

At step 326 the URL's subdomain is changed to "www." The logic then proceeds to step 304.

At step 322 a default image is loaded. In the present embodiment, the default image is loaded because the image associated with the URL could not be generated. In another embodiment the default image states that the image associated with the URL could not be generated. In yet another embodiment the default image is loaded using the path associated with the default image. The logic then proceeds to step 320.

At step 320 a determination is made as to whether the image is in the size requested. In the present embodiment the image size is compared to the image size contained in the request parameters. If the image is the requested size, the logic proceeds to step 332. If the image is not the requested size, the logic proceeds to step 330.

At step 330 the image is resized. In the present embodiment the image is resized according to the image size in the request parameters. The logic then proceeds to step 332.

At step 332 the image is served to the requesting application. The logic then proceeds to step 334.

At step 334 a determination is made as to whether the image is the default image. If the image is the default image, the logic proceeds to step 338. If the image is not the default image, the logic proceeds to step 336.

At step 336 the serve count value is incremented by one. In the present embodiment the serve count represents the number of times the image has been served to the requesting application. The logic then proceeds to step 338.

At step 338 the entry is removed from the second database. The logic then proceeds to step 302.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise.

We claim:

1. A method for generating, managing, and delivering digital images in a computer networked environment, each digital image for display in a computer application graphical user interface to represent a result of a search for information as performed by a user, the method steps comprising:
   receiving, from the user's computer application, a Uniform Resource Locator (URL) and at least one display parameter;
   determining if a first image associated with the URL and having the at least one display parameter is stored in a first database;
   if the first image is stored in the first database:
      providing the first image to the application interface for display before the user;
   if the first image is not stored in the first database:
      generating a base image associated with the URL and the at least one display parameter;
      providing the base image to the application interface for display before the user;
   displaying the one of the first image and the base image provided as part of the digital images representing the result of the search for information; and
   if the base image associated with the URL cannot be generated according to the URL as provided by the application:
      (a) truncating the URL;
      (b) generating the base image associated with the truncated URL;
      (c) determining if the base image is displayable; and
      (d) repeating steps (a) through (c) until the URL's file extension is a top level domain (TLD).

2. The method of claim 1, the method steps further comprising:
   generating the first image by resizing the base image according to the at least one display parameter if the first image is not stored in the first database, prior to providing the first image to the application interface.

3. The method of claim 2, the method steps further comprising:
   generating the first image by resizing a default image according to the at least one display parameter, if the base image cannot be generated.

4. The method of claim 1, the method steps further comprising:
   if the base image associated with the URL cannot be generated according to the URL as provided by the application:
      categorizing the URL according to its file extension.

5. The method of claim 1, the method steps further comprising:
   maintaining and monitoring a refresh flag to determine when to regenerate the requested base image.

6. An automated system for generating, managing, and delivering digital images in a computer networked environment, each digital image for display in a computer application graphical user interface to represent a result of a search for information as performed by a user, the system comprising:
   a data storage device comprising a first database;
   a networked computer processor device capable of executing machine-readable instructions to perform the program steps comprising: receiving, from the user's computer application, a Uniform Resource Locator (URL) and at least one display parameter;
   determining if a first image associated with the URL and having the at least one display parameter is stored in the first database;
   if the first image is stored in the first database:
      providing the first image to the application interface for display before the user;
   if the first image is not stored in the first database:
      generating a base image associated with the URL and the at least one display parameter; and
      providing the base image to the application interface for display before the user;

displaying the one of the first image and the base image provided as part of the digital images representing the result of the search for information, and if the base image associated with the URL cannot be generated according to the URL as provided by the application:
(a) truncating the URL;
(b) generating the base image associated with the truncated URL;
(c) determining if the base image is displayable; and
(d) repeating steps (a) through (c) until the URL's file extension is a top level domain (TLD).

7. The system of claim 6, the computer processor device program steps further comprising:
generating the first image by resizing the base image according to the at least one display parameter if the first image is not stored in the first database, prior to providing the first image to the application interface.

8. The system of claim 7, the computer processor device program steps further comprising:
generating the first image by resizing a default image according to the at least one display parameter, if the base image cannot be generated.

9. The system of claim 6, the computer processor device program steps further comprising:
if the base image associated with the URL cannot be generated according to the URL as provided by the application:
categorizing the URL according to its file extension.

10. The system of claim 6, the computer processor device program steps further comprising:
maintaining and monitoring a refresh flag to determine when to regenerate the requested base image.

11. A computer software program tangibly embodied in a non-transitory computer readable medium, the program including machine-readable instructions executable by a computer processor to perform a method for generating, managing, and delivering digital images in a computer networked environment, each digital image for display in a computer application graphical user interface to represent a result of a search for information as performed by as user, the program steps comprising: receiving, from the user's computer application, a Uniform Resource Locator (URL) and at least one display parameter; determining if a first image associated with the URL and having the at least one display parameter is stored in a first database; if the first image is stored in the first database: providing the first image to the application interface for display before the user; if the first image is not stored in the first database: generating a base image associated with the URL and the at least one display parameter; and providing the base image to the application interface for display before the user; displaying the one of the first image and the base image provided as part of the digital images representing the result of the search for information: and if the base image associated with the URL cannot be generated according to the URL as provided by the application: (a) truncating the URL; (b) generating the base image associated with the truncated URL; (c) determining if the base image is displayable; and (d) repeating steps(a) through (c)until the URL's file extension is a top level domain (TLD).

12. The computer software program of claim 11, the program steps further comprising:
generating the first image by resizing the base image according to the at least one display parameter if the first image is not stored in the first database, prior to providing the first image to the application interface.

13. The computer software program of claim 12, the program steps further comprising:
generating the first image by resizing a default image according to the at least one display parameter, if the base image cannot be generated.

14. The computer software program of claim 11, the program steps further comprising:
if the base image associated with the URL cannot be generated according to the URL as provided by the application:
categorizing the URL according to its file extension.

15. The computer software program of claim 11, the program steps further comprising:
maintaining and monitoring a refresh flag to determine when to regenerate the requested base image.

* * * * *